US010582195B2

(12) United States Patent
Liu et al.

(10) Patent No.: US 10,582,195 B2
(45) Date of Patent: Mar. 3, 2020

(54) INTRA PREDICTION USING UNEQUAL WEIGHT PLANAR PREDICTION

(71) Applicant: Futurewei Technologies, Inc., Plano, TX (US)

(72) Inventors: Shan Liu, San Jose, CA (US); Xiang Ma, Shenzhen (CN)

(73) Assignee: Futurewei Technologies, Inc., Plano, TX (US)

(*) Notice: Subject to any disclaimer, the term of this patent is extended or adjusted under 35 U.S.C. 154(b) by 1 day.

(21) Appl. No.: 15/831,963

(22) Filed: Dec. 5, 2017

(65) Prior Publication Data

US 2018/0352222 A1 Dec. 6, 2018

Related U.S. Application Data

(60) Provisional application No. 62/514,373, filed on Jun. 2, 2017, provisional application No. 62/545,852, filed on Aug. 15, 2017.

(51) Int. Cl.
| | |
|---|---|
| H04N 19/105 | (2014.01) |
| H04N 19/11 | (2014.01) |
| H04N 19/182 | (2014.01) |
| H04N 19/176 | (2014.01) |
| H04N 19/593 | (2014.01) |

(52) U.S. Cl.
CPC ......... *H04N 19/105* (2014.11); *H04N 19/11* (2014.11); *H04N 19/176* (2014.11); *H04N 19/182* (2014.11); *H04N 19/593* (2014.11)

(58) Field of Classification Search
CPC ..... H04N 19/105; H04N 19/11; H04N 19/182
See application file for complete search history.

(56) References Cited

U.S. PATENT DOCUMENTS

| | | | |
|---|---|---|---|
| 5,912,707 | A | 6/1999 | Kim |
| 8,526,495 | B2 | 9/2013 | Liu et al. |
| 9,049,452 | B2 | 6/2015 | Liu et al. |

(Continued)

FOREIGN PATENT DOCUMENTS

| | | |
|---|---|---|
| CN | 102469308 A | 5/2012 |
| CN | 101325713 B | 6/2012 |

OTHER PUBLICATIONS

"Series H: Audiovisual and Multimedia Systems, Infrastructure of audiovisual services—Coding of moving video, High efficiency video coding," ITU-T, H.265, Dec. 2016, 664 pages.

(Continued)

*Primary Examiner* — Jeffery A Williams
(74) *Attorney, Agent, or Firm* — Conley Rose, P.C.

(57) ABSTRACT

A coding apparatus including a memory, a processor, and a display is provided. The processor is configured to assign a first weight to a first reference pixel in a first neighbor block and a second weight to a second reference pixel in a second neighbor block. The first weight assigned to the first reference pixel is greater than the second weight assigned to the second reference pixel because the first reference pixel is closer to a third reference pixel than the second reference pixel. The processor is also configured to compute a value of the third reference pixel based on the first weight of the first reference pixel and the second weight of the second reference pixel, and generate a current block based on the value of the third reference pixel. The display is configured to display an image generated based on the current block.

18 Claims, 12 Drawing Sheets

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,609,343 | B1 | 3/2017 | Chen et al. |
| 9,769,472 | B2 | 9/2017 | Liu et al. |
| 9,788,019 | B2 | 10/2017 | Liu et al. |
| 9,813,726 | B2 | 11/2017 | Liu et al. |
| 2008/0304759 | A1 | 12/2008 | Lee et al. |
| 2010/0232505 | A1 | 9/2010 | Thoreau et al. |
| 2014/0086323 | A1 | 3/2014 | Chuang et al. |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2017/0272745 | A1 | 9/2017 | Liu et al. |
| 2017/0353730 | A1 | 12/2017 | Liu et al. |
| 2017/0374369 | A1 | 12/2017 | Chuang et al. |

OTHER PUBLICATIONS

Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.
Liu, S., et al., Complexity Reduction of Joint Temporal-Spatial Bit Allocation Using R-D Models for Video Streaming, IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H. 264/AVC," IEEE International Symposium on Circuits and Systems, 2008, pp. 636-639.
Lou, J., et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-S0123, Oct. 17-24, 2014, 7 pages.
Xu, X., et al., "CE2 Test 3.2: Intra BC merge mode with default candidates," JCTVC-T0073, Feb. 10-18, 2015, 6 pages.
Panusopone, et al., "UW-Planar and Constrained PDPC," JVET-E0068, ARRIS, 2015, 11 pages.
Panusopone, et al., "Unequal Weight Planar Prediction and Constrained PDPC," Joint Video Exploration Team (JVET) of ITU-T SG 16 WP 3 and ISO/IECJTC 1/SC 29/WG11, Document JVET-E0068-r1, 5th Meeting, Geneva, CH, Jan. 12-20, 2017, 6 pages.
Machine Translation and Abstract of Chinese Publication No. CN102469308, May 23, 2012, 20 pages.
Foreign Communication From A Counterpart Application, PCT Application No. PCT/CN2018/089819, English Translation of International Search Report dated Sep. 10, 2018, 5 pages.
Foreign Communication From A Counterpart Application, PCT Application No. PCT/CN2018/089819, English Translation of Written Opinion dated Sep. 10, 2018, 4 pages.

INTRA PREDICTION USING UNEQUAL WEIGHT PLANAR PREDICTION

CROSS-REFERENCE TO RELATED APPLICATIONS

This patent application claims the benefit of U.S. Provisional Patent Application No. 62/514,373, filed Jun. 2, 2017, by Shan Liu, et al., and titled "Intra Prediction Using Unequal Weight Planar Prediction," and U.S. Provisional Patent Application No. 62/545,852, filed Aug. 15, 2017, by Shan Liu, et al., and titled "Intra Prediction Using Unequal Weight Planar Prediction," the teachings and disclosures of which are hereby incorporated in their entireties by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

For example, video compression may use intra-frame prediction, in which a pixel may be predicted from a reference pixel in the same video frame or slice. When using intra prediction in a lossy mode, transform and quantization operations may occur on a block by block basis, which may limit intra prediction for a given block to the use of reference samples in adjacent blocks for prediction of pixels within the given block. However, Joint Collaborative Team on Video Coding (JCT-VC) within the International Telecommunication Union Telecommunications Standardization Sector (ITU-T), which is responsible for a next generation video coding standard, referred to as High Efficiency Video Coding (HEVC), has considered prediction based on adjacent pixels in a block for lossless coding in intra prediction modes. These prediction techniques may be referred to as pixel-by-pixel, sample-by-sample, or pixel-based intra prediction.

SUMMARY

In an embodiment, the disclosure includes a method of coding implemented by a coding device. The method includes assigning a first weight to a first reference pixel in a first neighbor block and a second weight to a second reference pixel in a second neighbor block, wherein the first weight assigned to the first reference pixel is greater than the second weight assigned to the second reference pixel because the first reference pixel is closer to a third reference pixel than the second reference pixel, computing a value of the third reference pixel based on the first weight of the first reference pixel and the second weight of the second reference pixel, generating a current block based on the value of the third reference pixel, and displaying, on a display of an electronic device, an image generated based on the current block.

Optionally, in any of the preceding aspects, another implementation of the aspect provides the first reference pixel is a top right (TR) reference pixel and the second reference pixel is a bottom left (BL) reference pixel. Optionally, in any of the preceding aspects, another implementation of the aspect provides the third reference pixel is a bottom right (BR) reference pixel. Optionally, in any of the preceding aspects, another implementation of the aspect provides the current block is a rectangle. Optionally, in any of the preceding aspects, another implementation of the aspect provides the value of the third reference pixel and the first weight of the first reference pixel are used to calculate a weighted value for each intermediate reference pixel in a column extending between the third reference pixel and the first reference pixel. Optionally, in any of the preceding aspects, another implementation of the aspect provides the value of the third reference pixel and the second weight of the second reference pixel are used to calculate a weighted value for each reference pixel in a row extending between the third reference pixel and the second reference pixel. Optionally, in any of the preceding aspects, another implementation of the aspect provides the current block is generated based on a weighted value determined for each reference pixel in a column extending between the third reference pixel and the first reference pixel and in a row extending between the third reference pixel and the second reference pixel. Optionally, in any of the preceding aspects, another implementation of the aspect provides the first weight is assigned based on a first number of reference pixels disposed between the third reference pixel and the second reference pixel, and the second weight is assigned based on a second number of reference pixels disposed between the third reference pixel and the first reference pixel. Optionally, in any of the preceding aspects, another implementation of the aspect provides the first weight is assigned based on a first distance between the third reference pixel and the second reference pixel, and the second weight is assigned based on a second distance between the third reference pixel and the first reference pixel.

In an embodiment, the disclosure includes a coding apparatus comprising a memory containing instructions, a processor coupled to the memory, the processor configured to execute the instructions stored in the memory to cause the processor to assign a first weight to a first reference pixel in a first neighbor block and a second weight to a second reference pixel in a second neighbor block, wherein the first weight assigned to the first reference pixel is greater than the second weight assigned to the second reference pixel because the first reference pixel is closer to a third reference pixel than the second reference pixel, compute a value of the third reference pixel based on the first weight of the first reference pixel and the second weight of the second reference pixel, and generate a current block based on the value of the third reference pixel, and a display coupled to the processor, the display configured to display an image generated based on the current block.

Optionally, in any of the preceding aspects, another implementation of the aspect provides the first reference pixel is a top right (TR) reference pixel and the second reference pixel is a bottom left (BL) reference pixel. Optionally, in any of the preceding aspects, another implementation of the aspect provides the third reference pixel is a bottom right (BR) reference pixel. Optionally, in any of the preceding aspects, another implementation of the aspect provides the current block is a rectangle. Optionally, in any of the preceding aspects, another implementation of the aspect provides the value of the third reference pixel and the first weight of the first reference pixel are used to calculate a weighted value for each intermediate reference pixel in a column extending between the third reference pixel and the first reference pixel. Optionally, in any of the preceding aspects, another implementation of the aspect provides the value of the third reference pixel and the second weight of the second reference pixel are used to calculate a weighted value for each intermediate reference pixel in a row extending between the third reference pixel and the second reference pixel. Optionally, in any of the preceding aspects, another implementation of the aspect provides the current block is generated based on a weighted value determined for each intermediate reference pixel in a column extending between the third reference pixel and the first reference pixel and in a row extending between the third reference pixel and the second reference pixel. Optionally, in any of the preceding aspects, another implementation of the aspect provides the first weight is assigned based on a first number of intermediate reference pixels disposed between the third reference pixel and the first reference pixel, and the second weight is assigned based on a second number of intermediate reference pixels disposed between the third reference pixel and the second reference pixel. Optionally, in any of the preceding aspects, another implementation of the aspect provides the first weight is assigned based on a first distance between the third reference pixel and the first reference pixel, and the second weight is assigned based on a second distance between the third reference pixel and the second reference pixel.

In an embodiment, the disclosure includes a method of coding implemented by a coding device. The method includes determining a weighting for a first reference pixel based on a first distance from a second reference pixel and a second distance from a third reference pixel, generating a shifted weighting for the first reference pixel by increasing the weighting relative to the second reference pixel and decreasing the weighting relative to the third reference pixel, generating a current block based on the shifted weighting, and displaying, on a display of an electronic device, an image generated based on the current block.

Optionally, in any of the preceding aspects, another implementation of the aspect provides the first reference pixel is disposed in one of a row of reference pixels adjacent to the current block and a column of reference pixels adjacent to the current block. Optionally, in any of the preceding aspects, another implementation of the aspect provides the second reference pixel is a bottom left (BL) reference pixel. Optionally, in any of the preceding aspects, another implementation of the aspect provides the second reference pixel is a top right (TR) reference pixel. Optionally, in any of the preceding aspects, another implementation of the aspect provides the third reference pixel is a bottom right (BR) reference pixel. Optionally, in any of the preceding aspects, another implementation of the aspect provides the second reference pixel is a reconstructed pixel from a neighbor block adjacent to the current block and the third reference pixel is an estimated pixel. Optionally, in any of the preceding aspects, another implementation of the aspect provides a value of the third reference pixel is computed based on a first weight assigned to the second reference pixel and a second weight assigned to a fourth reference pixel, and wherein the first weight is greater than the second weight because the second reference pixel is closer to the third reference pixel than the fourth reference pixel.

In an embodiment, the disclosure includes a coding apparatus including a memory containing instructions, a processor coupled to the memory, the processor configured to execute the instructions stored in the memory to cause the processor to determine a weighting for a first reference pixel based on a first distance from a second reference pixel and a second distance from a third reference pixel, generate a shifted weighting for the first reference pixel by increasing the weighting relative to the second reference pixel and decreasing the weighting relative to the third reference pixel, and generate a current block based on the shifted weighting, and a display coupled to the processor, the display configured to display an image generated based on the current block.

Optionally, in any of the preceding aspects, another implementation of the aspect provides the first reference pixel is disposed in one of a row of reference pixels adjacent to the current block and a column of reference pixels adjacent to the current block. Optionally, in any of the preceding aspects, another implementation of the aspect provides the second reference pixel is a bottom left (BL) reference pixel. Optionally, in any of the preceding aspects, another implementation of the aspect provides the second reference pixel is a top right (TR) reference pixel. Optionally, in any of the preceding aspects, another implementation of the aspect provides the third reference pixel is a bottom right (BR) reference pixel. Optionally, in any of the preceding aspects, another implementation of the aspect provides a value of the third reference pixel is computed based on a first weight assigned to the second reference pixel and a second weight assigned to a fourth reference pixel, wherein the first weight is greater than the second weight because the second reference pixel is closer to the third reference pixel than the fourth reference pixel.

In an embodiment, the disclosure includes a method of coding implemented by a coding device. The method includes comprising determining a first weighting for a first pixel in a current block based on a horizontal distance from a first reference pixel in a first column and a first reconstructed pixel in a reconstructed pixel column in a first neighbor block, generating a horizontal shifted weighting for the first pixel by increasing the first weighting relative to the first reconstructed pixel and decreasing the first weighting relative to the first reference pixel, calculating a horizontal estimated pixel value based on the horizontal shifted weighting, determining a second weighting for the first pixel in the current block based on a vertical distance from a second reference pixel in a first row and a second reconstructed pixel in a reconstructed pixel row in a second neighbor block, generating a vertical shifted weighting for the first pixel by increasing the second weighting relative to the second reconstructed pixel and decreasing the second weighting relative to the second reference pixel, calculating a vertical estimated pixel value based on the vertical shifted weighting, determining an estimated pixel value for the first pixel in the current block based on the horizontal estimated pixel value and the vertical estimated pixel value, and displaying, on a display of an electronic device, an image generated based on the current block.

Optionally, in any of the preceding aspects, another implementation of the aspect provides the method further includes computing a value of a bottom right reference pixel based a first weight of a top right reference pixel and a second weight of a bottom left reference pixel, wherein the first weight is greater than the second weight when the top right reference pixel is closer to the bottom right reference pixel than the bottom left reference pixel, and wherein the second weight is greater than the first weight when the bottom left reference pixel is closer to the bottom right reference pixel than the top right reference pixel, computing a value for each reference pixel in the first column of the reference pixels extending between the top right reference pixel and the bottom right reference pixel, and computing a value for each reference pixel in the first row of the reference pixels extending between the bottom left reference pixel and the bottom right reference pixel. Optionally, in any of the preceding aspects, another implementation of the aspect provides the method further includes determining a reference pixel weighting for the first reference pixel based on a first distance from a second reference pixel and a second distance from a third reference pixel, and generating a shifted weighting for the first reference pixel by increasing the weighting relative to the second reference pixel and decreasing the weighting relative to the third reference pixel. Optionally, in any of the preceding aspects, another implementation of the aspect provides the method further includes copying a value of a top right reference pixel to each reference pixel in the first column. Optionally, in any of the preceding aspects, another implementation of the aspect provides the method further includes copying a value of a bottom left reference pixel to each reference pixel in the first row. Optionally, in any of the preceding aspects, another implementation of the aspect provides the method further includes averaging the horizontal estimated pixel value and the vertical estimated pixel value to determine the estimated pixel value.

In an embodiment, the disclosure includes a coding apparatus including a memory containing instructions, a processor coupled to the memory, the processor configured to execute the instructions stored in the memory to cause the processor to determine a first weighting for a first pixel in a current block based on a horizontal distance from a first reference pixel in a first column and a first reconstructed pixel in a reconstructed pixel column in a first neighbor block, generate a horizontal shifted weighting for the first pixel by increasing the first weighting relative to the first reconstructed pixel and decreasing the first weighting relative to the first reference pixel, calculate a horizontal estimated pixel value based on the horizontal shifted weighting, determine a second weighting for the first pixel in the current block based on a vertical distance from a second reference pixel in a first row and a second reconstructed pixel in a reconstructed pixel row in a second neighbor block, generate a vertical shifted weighting for the first pixel by increasing the second weighting relative to the second reconstructed pixel and decreasing the second weighting relative to the second reference pixel, calculate a vertical estimated pixel value based on the vertical shifted weighting, and determine an estimated pixel value for the first pixel in the current block based on the horizontal estimated pixel value and the vertical estimated pixel value, and a display coupled to the processor, the display configured to display an image generated based on the current block.

Optionally, in any of the preceding aspects, another implementation of the aspect provides the processor is further configured to compute a value of a bottom right reference pixel based a first weight of a top right reference pixel and a second weight of a bottom left reference pixel, wherein the first weight is greater than the second weight when the top right reference pixel is closer to the bottom right reference pixel than the bottom left reference pixel, and wherein the second weight is greater than the first weight when the bottom left reference pixel is closer to the bottom right reference pixel than the top right reference pixel, compute a value for each reference pixel in the first column of the reference pixels extending between the top right reference pixel and the bottom right reference pixel, and compute a value for each reference pixel in the first row of the reference pixels extending between the bottom left reference pixel and the bottom right reference pixel. Optionally, in any of the preceding aspects, another implementation of the aspect provides the processor is further configured to copy a value of a top right reference pixel to each reference pixel in the first column. Optionally, in any of the preceding aspects, another implementation of the aspect provides the processor is further configured to copy a value of a bottom left reference pixel to each reference pixel in the first row. Optionally, in any of the preceding aspects, another implementation of the aspect provides the estimated pixel value is determined by averaging the horizontal estimated pixel value and the vertical estimated pixel value.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video compression techniques such as motion compensation, intra prediction, and loop filters have been proved to be effective and thus adopted into various video coding standards, such as H.264/Advanced Video Coding (AVC) and H.265/HEVC.

Intra prediction can be used when there is no available reference picture, or when inter predication coding is not used for the current block or picture. The reference samples of intra prediction are usually derived from previously coded (or reconstructed) neighboring blocks in the same picture. For example, both in H.264/AVC and H.265/HEVC, the boundary samples of adjacent blocks are used as reference for intra prediction. In order to cover different texture or structural character, there are many different intra prediction modes. In each mode, a different prediction sample derivation method is used. For example, H.265/HEVC supports a total of 35 intra prediction modes.

Figure 1:
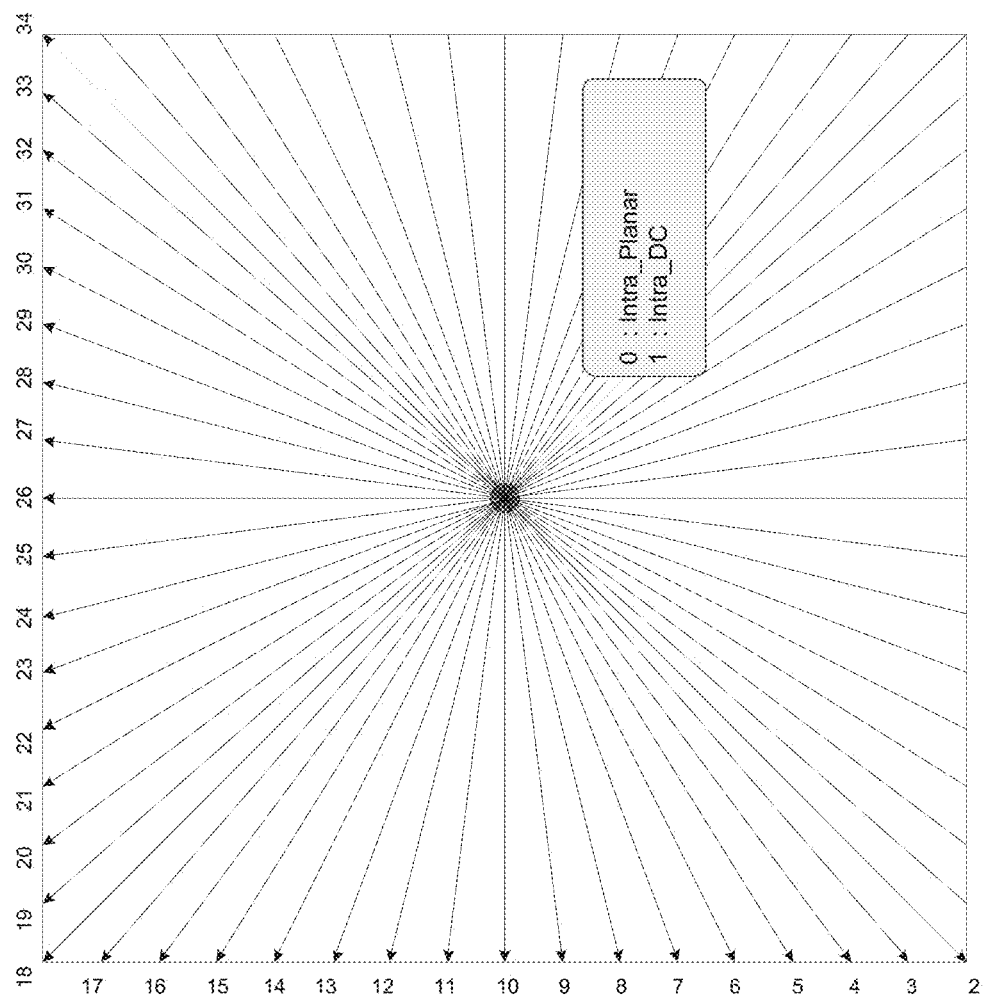
FIG. 1 is a mapping between an intra prediction direction and an intra prediction mode number.

The intra prediction algorithm description of H.265/HEVC is discussed below. The decoded boundary samples of adjacent blocks are used as reference for spatial prediction in regions where inter prediction is not performed. The encoder selects the best luma intra prediction mode of each block from 35 options: 33 directional prediction modes, a direct current (DC) mode, and a planar mode. The mapping 100 between the intra prediction direction and the intra prediction mode number is specified in FIG. 1.

Figure 2:
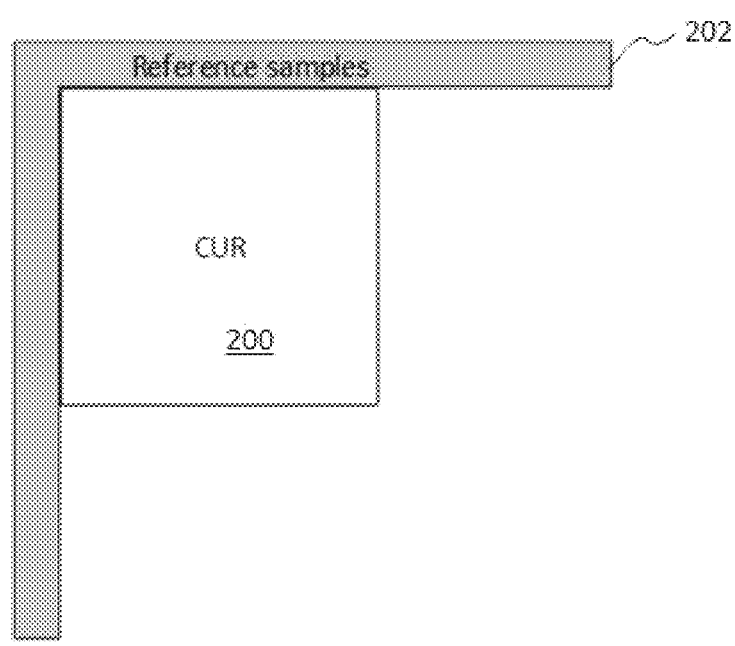
FIG. 2 depicts a current block to predict and reference samples (e.g., reconstructed pixels from neighbor blocks) used for prediction.

FIG. 2 depicts a current block 200 "CUR" to predict and reference samples 202 used for prediction. Those skilled in the art will recognize that the reference samples 202 are a collection of individual pixels (not shown) adjacent to the current block 200. In an embodiment, the reference samples 202 used for prediction are reconstructed pixels from adjacent neighbor blocks. As shown, the reference samples 202 are the pixels disposed at the boundary of the adjacent neighbor blocks. For example, the reference samples 202 in FIG. 2 represent a top row of reconstructed pixels from one or more neighbor blocks above the current block 200, and a left column of reconstructed pixels from one or more other neighbor blocks to the left of the current block 200. The prediction sample can be derived by mapping the reference samples 202 according to a specific method, which is indicated by the intra prediction mode selected from the available options.

Figure 3:
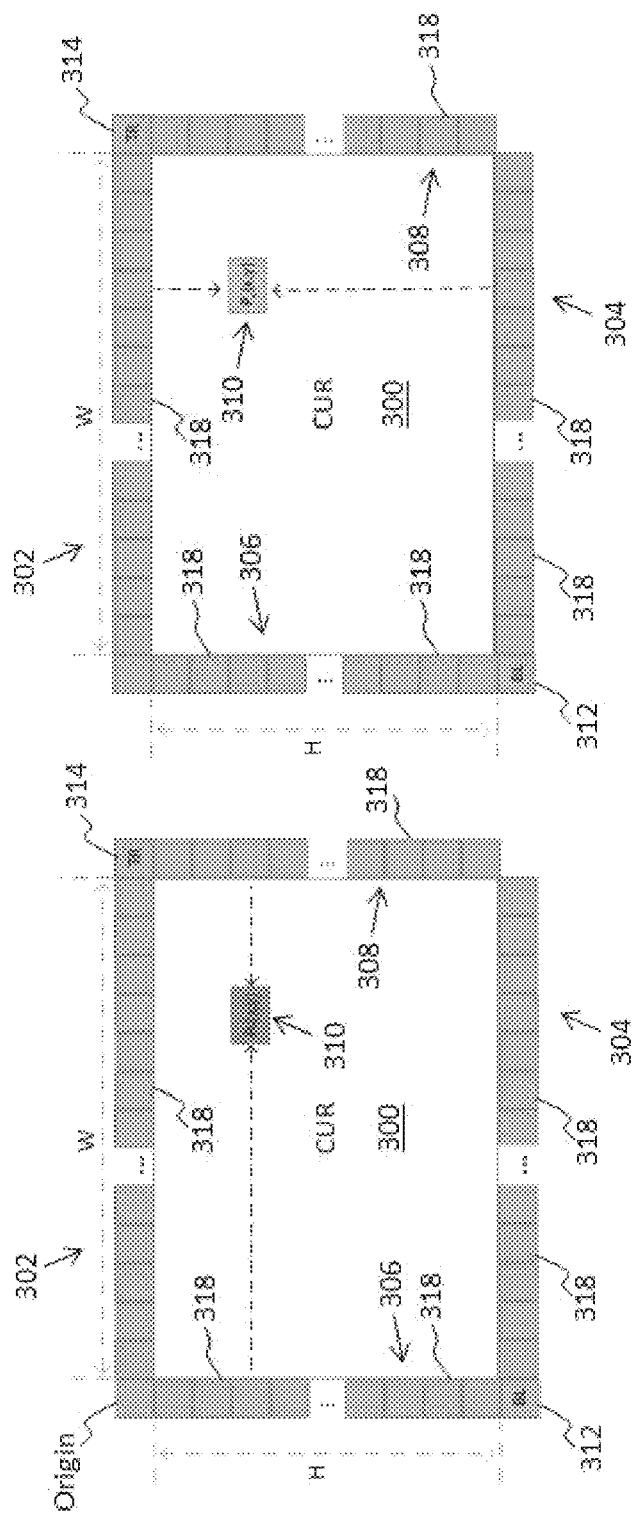
FIG. 3 depicts the current block to predict, neighbor rows, neighbor columns, and a particular pixel in the current block being estimated.

FIG. 3 depicts the current block 300 "CUR" to predict, neighbor rows 302, 304, neighbor columns 306, 308, and predictors 310 for a particular pixel in the current block 300 being estimated. The current block 300 of FIG. 3 is similar to the current block 200 of FIG. 2. Likewise, the neighbor row 302 and neighbor column 306 are similar to the reference samples 202 in FIG. 2.

The current block 300 has a width W and a height H. In an embodiment, the current block 300 is a rectangle and each of the width and height is a power of 2. For example, the current block 300 is an 8×4 block with a width of 8 and a height of 4. The current block 300 may have other dimensions in practical applications such as, for example, 16×8, 32×16, and so on. The current block may also be a square and have dimensions such as 4×4, 8×8, and so on.

For the planar mode, some concepts are defined as follows. The neighbor row 302 is disposed above the current block 300 and may be referred to as the top row. The neighbor row 304 is disposed below the current block 300 and may be referred to as the bottom row. The neighbor column 306 is disposed to the left of the current block 300 and may be referred to as the left column. The neighbor column 308 is disposed to the right of the current block 300 and may be referred to as the right column. The BL reference pixel 312 is the neighbor sample on the bottom left of the current block 300. The TR reference pixel 314 is the neighbor sample on the bottom left of the current block 300. The BR reference pixel 316 (see FIG. 4) is the neighbor sample on the bottom right of the current block 300.

Planar prediction is designed to generate a prediction surface without discontinuities. It generates a first order approximation of the prediction for the current block (e.g., current block 300) by forming a plane based on the intensity values (a.k.a., value) of the neighboring samples. As used herein, the terms neighboring and neighbor may be used interchangeably. Due to the raster-scan processing order, a reconstructed right column and bottom row neighbor samples are not available for the current block. In some circumstances, the planar predictor generation process first sets the value of all the reference pixels 318 (a.k.a., neighbor samples) in the right column 308 to be the same as the value of the TR reference pixel 314, and the values of all the reference pixels 318 in the bottom row 304 to be the same as the value of the BL reference pixel 312. Once the reference pixels 318 surrounding current block 300 are defined (e.g., given values), the horizontal and the vertical predictors 310 (e.g., labeled $P_h(x,y)$ and $P_v(x,y)$, respectively) for each pixel (e.g., P(x,y)) within the current block 300 are determined. The vertical predictors may be referred to as estimated pixel values. The final planar predictor (a.k.a., final estimated pixel value) is computed by averaging the horizontal and vertical predictors 310. A certain adjustment may be made when the current block 300 is non-square (e.g., rectangular).

Some descriptions about the coordinates (x,y) are provided. The top left sample in current block 300 is the origin of the coordinates. The x-axis positive direction progresses from left-to-right, and the y-axis positive direction progresses from top to bottom.

The prediction value of a sample for (x,y), referred to as P(x,y), in the current block 300 is determined by the formula:

$$P(x,y)=(H \times P_h(x,y)+W \times P_v(x,y))/(2 \times H \times W) \qquad (1)$$

Here $P_h(x,y)$ are the horizontal predictors, and $P_v(x,y)$ are the vertical predictors.

$$P_h(x,y)=(W-1-x) \times P(-1,y)+(x+1) \times P(W,-1) \qquad (2)$$

$$P_v(x,y)=(H-1-y) \times P(x,-1)+(y+1) \times P(-1,H) \qquad (3)$$

The above description is a general mathematical description. In actual implementation, the division operation will involve a factor in a rounding process, which is dependent on the denominator. For simplicity, the factor is omitted in the present disclosure.

There are potentially two problems with the planar mode. First, all the right column neighboring samples are set to the same value. Similarly, all the bottom row neighboring samples are set to the same value. Hence, the right column neighboring samples and the bottom row neighboring samples are less accurate. The second problem with planar mode comes from the final predictor, where equal weights are assigned to both the horizontal and the vertical predictors. Equal weight assignment is suboptimal, given some neighboring samples are more accurate than the others.

Figure 4:
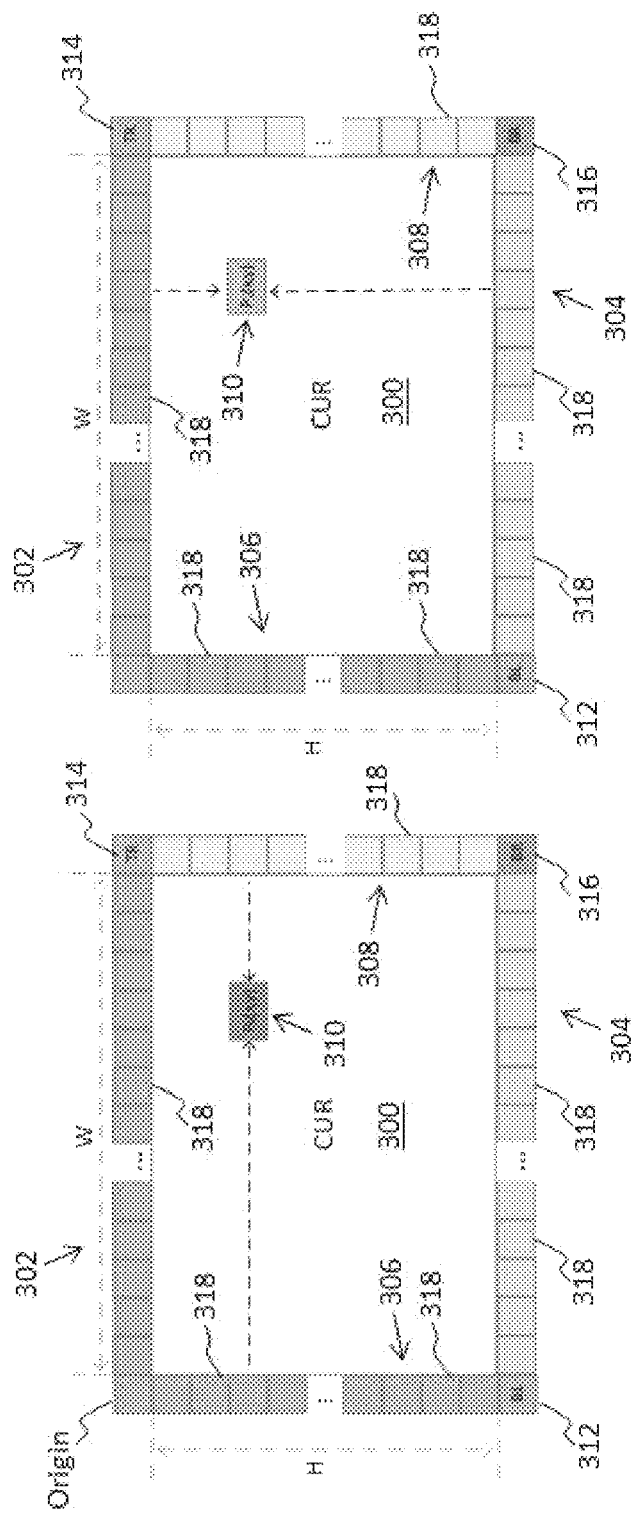
FIG. 4 depicts a bottom right (BR) reference pixel, a top right (TR) reference pixel, a bottom left (BL) reference pixel, a bottom row of reference pixels, a right column of reference pixels, and a pixel in the current block being estimated.

Disclosed herein is a method of using unequal weight planar (UWP) prediction. In the Joint Exploration Team on Future Video Coding (JVET) document JVET-E0068 entitled "Unequal Weight Planar Prediction and Constrained PDPC" by K. Panusopone, et al., dated Jan. 12-20, 2017, which is incorporated herein by reference, a UWP prediction algorithm is proposed to replace the previous planar mode, as shown in FIG. 4. There are at least two modifications, namely the bottom right position adjustment and an unequal weight assignment for final predictor calculation, which are detailed below.

In the present disclosure, the value of the bottom right neighboring sample (e.g., the BR reference pixel 316) is computed, as described in equation (4). Then, the value of the bottom row neighboring samples (e.g., the reference pixels 318 in row 304) and the right column neighboring samples (e.g., the reference pixels 318 in column 308) are computed using the derived value of the bottom right neighboring sample along with the value of other corner neighboring samples, e.g., the top right neighboring sample and the bottom left neighboring sample, as described in equations (5) and (6).

$$P(W,H)=(H \times P(W,-1)+W \times P(-1,H))/(H+W) \quad (4)$$

$$P(x,H)=((W-x-1) \times P(-1,H)+(x+1) \times P(W,H))/W \quad (5)$$

$$P(W,y)=((H-y-1) \times P(W,-1)+(y+1) \times P(W,H))/H \quad (6)$$

Once the neighboring samples surrounding the current block 300 are defined, the horizontal and the vertical predictors 310 for each sample within the current block 300 are determined as before.

Unequal weight is employed to take advantage of a difference in accuracy of input intensity in the final interpolation process. Specifically, larger weights are applied to the positions that are closer to more reliable neighboring positions. The top row and the left column neighboring samples are the actual reconstructed samples, and hence are more reliable than the bottom row and right column neighboring samples, which are estimated samples. The final predictor calculation with unequal weight assignment is described in equation (7).

$$P(x,y)=(H \times P_h(x,y) \times (y+1)+W \times P_v(x,y) \times (x+1))/(H \times W \times (x+y+2)) \quad (7)$$

Despite the compression advantage that has been shown for the UWP in related arts, some areas can be improved to achieve higher coding gain. In particular, three areas have been identified. First, the derivation method of the value of the BR reference pixel 316. Here, some linear model based derivation methods are proposed. Second, the derivation method of the values of reference samples in the bottom row 304 and the right column 308 are proposed. Here, some improved derivation methods based on linear mode are proposed in which larger weights are applied to the bottom left sample (e.g., the BL reference pixel 312) and the top right sample (e.g., TR reference pixel 314). In general, the proposed improved models favor the bottom left sample and top right sample. Third, the derivation method of the prediction value of the sample in current block. Here, some improved derivation methods based on linear mode are proposed in which larger weights are applied to the left sample (e.g., the reconstructed pixel in the left column 306) and the top sample (e.g., the reconstructed pixel in the top row 302). In general, the proposed improved models favor the left sample and top sample. A set of methods are presented in the present disclosure with emphasis on these three aspects.

In the present disclosure, the embodiments are described from the perspective of the decoder (e.g., the decoder side). Thus, the input for the process is a bitstream. The output of the process is a list of decoded pictures. However, those skilled in the art will appreciate that the embodiments disclosed herein are also applicable from the perspective of the encoder (e.g., the encoder side).

To calculate the value of the bottom right sample in JVET-E0068, the weights that are given to the bottom left sample and top right sample are proportional to the distances of the bottom right sample (e.g., BR reference pixel 316) position. That is, the further away the reference pixel is, the more weight it is given in the weighted average. In the present disclosure, a method is presented to use a linear model to generate the weighted averaged bottom right reference sample in which the weights of the bottom left sample and top right sample are inversely proportional to the distances of bottom right sample position. That is, the closer the reference pixel is, the more weight it is given in the weighted average. In an embodiment, the weight is the factor or coefficient used as a value for the scaling process. For example, in an equation $P_2=W_0 \times P_0+W_1 \times P_1$, $W_0$ is the weight of $P_0$ and $W_1$ is the weight of $P_1$.

In the first method, the value of the bottom right sample is calculated using the following equation:

$$P(W,H)=(W \times P(W,-1)+H \times P(-1,H))/(H+W) \quad (8)$$

In this equation, the weights of the top right sample P(W, −1) and the bottom left sample P(−1, H) are inversely proportional to the distances with the bottom right sample P(W, H). In one specific example, the weight applied to the top right predictor is equal to the width of the current block, and the weight applied to the value of the bottom left predictor is equal to the height of the current block. This is a more reasonable weighting model compared to the model described in equation (4).

By way of example, a first weight is assigned to a first reference pixel (e.g., the TR reference pixel 314) in a first neighbor block and a second weight is assigned to a second reference pixel (e.g., the BL reference pixel 312) in a second neighbor block. The first weight assigned to the first reference pixel is greater than the second weight assigned to the second reference pixel because the first reference pixel is closer to a third reference pixel (e.g., the BR reference pixel 316) than the second reference pixel. This example may be suitably used for an 8×4 rectangular block, for example. If, however, the height of the block is greater than the width as in a 4×8 rectangular block, the first reference pixel would be the BL reference pixel 312, the second reference pixel would be the TR reference pixel 314, and the third reference pixel would remain the BR reference pixel 316, for example.

In an alternative solution, the derivation method of the bottom right sample is stated as follows in which the true distances are considered.

$$P(W,H)=((W+1) \times P(W,-1)+(H+1) \times P(-1,H))/(H+W+2) \quad (9)$$

Figure 5:
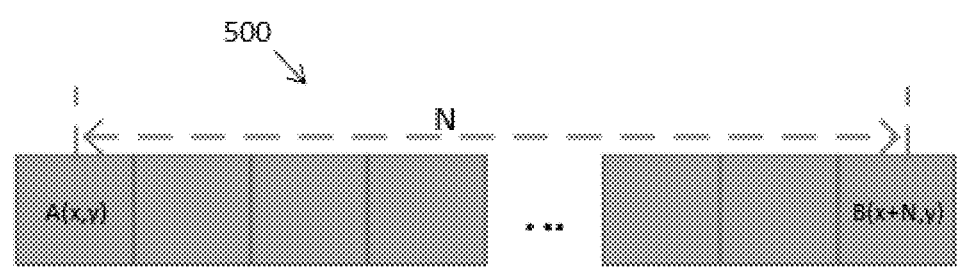
FIG. 5 depicts measurement of a true distance between reference pixels.

FIG. 5 depicts measurement 500 of a true distance N between reference pixels. Here, the true distance between samples A and B means the absolute value of difference of coordinate A and of B. As shown, the true distance is a center-to-center pixel measurement. Further details are provided below.

After the value of the bottom right sample is derived using the proposed model, the values of the samples (e.g., reference pixels 318) in the bottom row and the right column are calculated according to the equation (5) and equation (6) in JVET-E0068. This model (5-6) favors (e.g., gives more weight to) the bottom right sample. However, the value of the bottom right sample is estimated, and thus is generally less reliable than the values of the bottom left sample and the top right sample, which are truly reconstructed sample pixels. In the present disclosure, a method is presented to apply larger weights to the bottom left sample and the top right sample, rather than the bottom right sample.

In the second method, the values of the samples in the bottom row and the right column are calculated as follows:

$$P(x,H) = ((W-x) \times P(-1,H) + x \times P(W,H))/W \qquad (10)$$

$$P(W,y) = ((H-y) \times P(W,-1) + y \times P(W,H))/H \qquad (11)$$

In these equations (10-11), larger weights are applied to the bottom left sample and the top right sample. That is, the derived values of the samples in the bottom row and the right column favor (e.g., are more influenced by) the truly reconstructed values of the bottom left sample and the top right sample rather than the estimated value of the bottom right sample.

After the value of the bottom right sample is derived using equation (4) or (8), and also the values of the samples in the bottom row and the right column using equations (10-11) or (5-6), the prediction of the current block can be derived using equation (7).

In an alternative solution, the derivation of the value of the samples in the bottom row and the right column are stated as follows.

The value of the samples in the bottom row and the right column are calculated based on the follow equations, in which the true distances are considered:

$$P(x,H) = ((W-x) \times P(-1,H) + (x+1) \times P(W,H))/(W+1) \qquad (12)$$

$$P(W,y) = ((H-y) \times P(W,-1) + (y+1) \times P(W,H))/(H+1) \qquad (13)$$

A ratio α is predefined. For the samples in the bottom row, the value of samples P(x, H) are set as the value of the bottom left sample, when $0 \leq x \leq \alpha*W-1$. As for other samples in the bottom row, a modified linear model is used. Similarly, the samples in the right column also can use this method.

In summary, the value of samples in the bottom row and the right column can be derived using equations below:

$$P(x, H) = \begin{cases} P(-1, H), & 0 \leq x \leq \alpha*W-1 \\ \dfrac{(W-x) \times P(-1, H) + (x - \alpha*W) \times P(W, H)}{W - \alpha*W}, & \alpha*W \leq x < W \end{cases} \qquad (14)$$

$$P(W, y) = \begin{cases} P(W, -1), & 0 \leq y \leq \alpha*H-1 \\ \dfrac{(H-y) \times P(W, -1) + (y - \alpha*H) \times P(W, H)}{H - \alpha*H}, & \alpha*H \leq x < H \end{cases} \qquad (15)$$

Here, $0 \leq \alpha \leq 1$. Further details are provided below.

In the second method mentioned above, to calculate the values of the samples in the bottom row 304 and the right column 308, larger weights are applied to the bottom left sample (e.g., BL reference pixel 312) and the top right sample (e.g., TR reference pixel 314), rather than the bottom right sample (e.g., BR reference pixel 316), which is an estimated one.

By way of example, a weighting (e.g., 7,1) for a first reference pixel (e.g., the reference pixel 318 immediately to the right of the BL reference pixel 312) is determined based on a first distance from a second reference pixel (e.g., the BL reference pixel 312) and a second distance from a third reference pixel (e.g., the BR reference pixel 316). A shifted weighting (e.g., 8,0) is generated for the first reference pixel by increasing the weighting relative to the second reference pixel and decreasing the weighting relative to the third reference pixel. As such, the BL reference pixel 312, which is a reconstructed pixel, is given more influence than the BR reference pixel 316, which is an estimated pixel.

Similarly, for a sample in (x,y) location in the current block 300, both $P_h(x,y)$ and $P_v(x,y)$ are calculated. In the existing calculating method, larger weights are applied to the sample in the right column 308 and the bottom row 304. However, the values of samples in the bottom row 304 and the right column 308 are estimated. In the present disclosure, a method is presented to apply larger weights to the left sample (e.g., a reference pixel 318 in the left column 306) and the top sample (e.g., a reference pixel 318 in the top row 302), rather than the right sample (e.g., a reference pixel 318 in the right column 308) and bottom sample (e.g., a reference pixel 318 in the bottom row 304). In the formulas herein, the left sample means P(-1, y), the right sample means P(W, y), the top sample means P(x, -1), and the bottom sample means P(x, H).

In the third method, the prediction value of a sample in (x, y) location is P(x,y) in the current block. The value of its horizontal predictor $P_h(x,y)$ and the value of its vertical predictor $P_v(x,y)$ are as follows:

$$P_h(x,y) = (W-x) \times P(-1,y) + x \times P(W,y) \qquad (16)$$

$$P_v(x,y) = (H-y) \times P(x,-1) + y \times P(x,H) \qquad (17)$$

The values of P(W, y) and P(x, H) may be calculated using the methods and equations (10-15) described above.

In an alternative solution, the derivation of the value of $P_h(x,y)$, $P_v(x,y)$ are stated as follows:
(a) Using the true distances.

$$P_h(x,y) = (W-x) \times P(-1,y) + (x+1) \times P(W,y) \qquad (18)$$

$$P_v(x,y) = (H-y) \times P(x,-1) + (y+1) \times P(x,H) \qquad (19)$$

(b) Using a ratio α. A ratio α is predefined.

$$P_h(x, y) = \begin{cases} P(-1, y) \times W, & 0 \leq x \leq \alpha*W-1 \\ P(-1, y)*\alpha*W + (W-x) \times P(-1, y) + (x - \alpha*W) \times P(W, y), & \alpha*W \leq x < W \end{cases} \qquad (20)$$

$$P_v(x, y) = \begin{cases} P(x, -1) \times H, & 0 \leq y \leq \alpha*H-1 \\ P(x, -1)*\alpha*H + (H-y) \times P(x, -1) + (y - \alpha*H) \times P(x, H), & \alpha*H \leq y < H \end{cases} \qquad (21)$$

Here, $0 \leq \alpha < 1$.

After the values of $P_h(x,y)$, $P_v(x,y)$ are available, the final prediction value of P(x,y) in the current block 300 can be calculated using equation (7).

The final prediction value of P(x,y) in current block 300 can be calculated by averaging the value of its horizontal predictor $P_h(x,y)$ and the value of its vertical predictor $P_v(x,y)$ as follows:

$$P(x,y)=(P_h(x,y)/W+P_v(x,y)/H)/2 \quad (22)$$

And, if the derivation of the value of $P_h(x,y)$, $P_v(x,y)$ is performed using true distances (e.g., equation (18) and equation (19)), the final prediction value of P(x,y) in the current block 300 can be calculated by averaging the value of its horizontal predictor $P_h(x,y)$ and the value of its vertical predictor $P_v(x,y)$ as follows:

$$P(x,y)=(P_h(x,y)/(W+1)+P_v(x,y)/(H+1))/2 \quad (23)$$

Also, the final prediction value of P(x,y) in current block 300 can be calculated as the weighted average of the value of its horizontal predictor $P_h(x,y)$ and the value of its vertical predictor $P_v(x,y)$ as follows:

$$P(x,y)=(H \times P_h(x,y)+W \times P_v(x,y))/(2 \times H \times W) \quad (24)$$

The said weights are inversely proportional to distance. To be more specific, the weight applied to the value of the horizontal predictor $P_h(x,y)$ is equal to the distance from top sample P(x, −1) and bottom sample P(x, H), which is H. The weight applied to the value of the vertical predictor is equal to the distance from left sample P(−1, y) and right sample P(W, y), which is W. Thus, the weighting is shifted using a technique similar to that described above.

If the derivation of the value of $P_h(x,y)$, $P_v(x,y)$ is performed using true distances, the final prediction value also can use the true distances in the weighting calculation method, like:

$$P(x,y)=((H+1) \times P_h(x,y)+(W+1) \times P_v(x,y))/(2 \times (H+1) \times (W+1)) \quad (25)$$

Those methods listed in equations (16-25) also can be applied to the existing planar mode (e.g., the planar mode in H.265/HEVC).

In this case, the value of the right sample is P(W,−1) and the bottom sample is P(−1, H).

By way of example, equations (16-17) and (24) can be applied to the existing planar mode, then the prediction value of a sample in (x,y) P(x,y) in current block 300 is as follows:

$$P(x,y)=(H \times P_h(x,y)+W \times P_v(x,y))/(2 \times H \times W) \quad (26)$$

$$P_h(x,y)=(W-x) \times P(-1,y)+x \times P(W,-1) \quad (27)$$

$$P_v(x,y)=(H-y) \times P(x,-1)+y \times P(-1,H) \quad (28)$$

Other cases can be applied similarly. In an embodiment, the process of calculating a sample P(x,y) is repeated for each location (x,y) in the current block in order in order to generate or compute the current block. Additional embodiments and details are described below.

The present disclosure presents several differences relative to current solutions. When generating the estimate value of the bottom right reference sample pixel for intra prediction planar mode, the weighted average of the value of top right reconstructed pixel and the value of the bottom left reconstructed pixel is used. In the existing solution, the weights given to these two sample values are proportional to the distance between the sample pixel and the bottom right sample position, e.g., the further away sample value is given more weight while the closer by sample value is given less weight. In the present disclosure, the weights given to these two sample values are inversely proportional to the distance between the sample pixel and the bottom right sample position, e.g., the further away sample value is given less weight while the closer by sample value is given more weight.

In the existing solution, the method of calculating the estimated value of the samples in the bottom row and the right column favors (e.g., gives more weight to) the estimated bottom right sample value. In the present disclosure, the method of calculating the estimated value of the samples in the bottom row and the right column favors (e.g., gives larger weights) to the truly reconstructed bottom left sample value and the top right sample value. The solutions in the present disclosure are believed to provide more accurate prediction values for samples in the current block.

In the existing solution, the method of calculating the prediction value of the sample in the current block favors (e.g., give more weight to) the estimated bottom sample value and the right sample value. In the present disclosure, the method of calculating the prediction value of the sample in the current block favor (e.g., give larger weights) to the truly reconstructed left sample value and the top sample value. The solutions in the present disclosure are believed to provide more accurate prediction values for samples in the current block.

Embodiment 1: weights are inversely proportional with the distances.

In the existing UWP prediction method, to calculate the value of the bottom right sample, the weights of the bottom left sample and the top right sample are proportional to the distances of the bottom right sample. But it is reasonable to use a linear model rather than the current model in which the weights of the bottom left sample and the top right sample should be inversely proportional to the distances of the bottom right sample.

In the embodiment, the value of the bottom right sample is calculated according to equation (8). In this equation, the weights of the top right sample P(W,−1) and the bottom left sample P(−1,H) are inversely proportional to the distances with the bottom right sample P(W, H). This is a more reasonable weighting model compared with the model in JVET-E0068.

After the value of the bottom right sample is derived using the proposed model, the value of the sample in the bottom row and the right column are calculated according to equation (5) and equation (6) as before. And also, the prediction of the current block can be derived using equation (7).

Embodiment 2: weights are inversely proportional with the true distances.

The difference between embodiment 2 and embodiment 1 is when calculating the value of the bottom right sample, equation (9) is used.

Embodiment 3: derivation model favors the bottom left sample and the top right sample.

In the existing UWP method, the model used to calculate the sample values in the bottom row and the right column favor the bottom right sample actually. But the value of the bottom right sample is an estimated one, while the bottom left sample and the top right sample are reconstructed ones. Hence, the bottom left sample and the top right sample more reliable than the bottom right sample. Therefore, it is reasonable to use a model favoring the bottom left sample and the top right sample, rather than the bottom right sample.

In this embodiment, the value of the samples in the bottom row and the right column are calculated according to equations (10) and (11). In these two equations, the value of the samples in the bottom row and the right column will favor the bottom left sample and the top right sample, respectively.

After the value of the bottom right sample is available (using equation (4)), and also the value of the samples in the bottom row and the right column using equations (10) and (11), the prediction of the current block can be derived using equation (7).

Embodiment 4: derivation model favors the bottom left sample and the top right sample, and is based on the true distance.

The difference between embodiment 4 and embodiment 3 is when calculating the value of samples in the bottom row and the right column, equation (12) and equation (13) are used.

Embodiment 5: derivation model favors the bottom left sample and the top right sample, partly copied.

The difference between embodiment 5, embodiment 3, and embodiment 4 is when calculating the value of samples in the bottom row and the right column, equation (14) and equation (15) are used.

Embodiment 6: combination of embodiment 1 and embodiment 3.

Any embodiment of the first method may be combined with an embodiment of the second method. In this embodiment, a combination of embodiment 1 and embodiment 3 is proposed.

To calculate the value of the bottom right sample, equation (8) is used. After the value of the bottom right sample is available, the value of samples in the bottom row and the right column can be derived using equation (10) and equation (11). Then, the prediction of the current block can be derived using equation (7).

Embodiment 7: prediction value of the sample in the current block favors the left sample value and the top sample value (combine with existing UWP (Ph, Pv: 16-17)).

In the existing UWP method, the model used to calculate the prediction value of the sample in the current block favors (e.g., give more weight to) the estimated bottom sample value and the right sample value actually. But the value of the bottom sample and the right sample are estimated, while the left sample and the top sample are reconstructed ones. Hence, the left sample and the top sample are more reliable than the bottom sample and the right sample. Therefore, it is reasonable to use a model that favors the left sample and the top sample, rather than the bottom sample and the right sample.

In this embodiment, for a sample in (x,y) location, a predictor P(x,y) is determined in the current block. The value of its horizontal predictor $P_h(x,y)$ and the value of its vertical predictor $P_v(x,y)$ are calculated using equations (16) and (17). In these two equations, the prediction value of the sample in the current block favors (e.g., give more weight to) the left sample value and the top sample value, respectively. After the value of the bottom right sample is available (using equation (8)), and also the value of the samples in the bottom row and the right column (using equations (10) and (11)), the value of P(x,y)'s horizontal predictor $P_h(x,y)$ and the value of P(x,y)'s vertical predictor $P_v(x,y)$ are calculated using equations (16) and (17), and then the final predictor calculation using equation (7).

Embodiment 8: prediction value of the sample in the current block favors the left sample value and the top sample value (combine with existing UWP (Ph, Pv: 18-19), based on the true distance).

The difference between embodiment 8 and embodiment 7 is, for a sample in (x,y) location, P(x,y) in current block, the value of its horizontal predictor $P_h(x,y)$ and the value of its vertical predictor $P_v(x,y)$ are calculated using equations (18) and (19). And the final prediction value of P(x,y) is:

$$P(x,y)=((H+1)\times P_h(x,y)\times(y+1)+(W+1)\times P_v(x,y)\times(x+1))/((H+1)\times(W+1)\times(x+y+2)) \quad (29)$$

Embodiment 9: prediction value of the sample in the current block favors the left sample value and the top sample value (combine with existing UWP (Ph, Pv: 20-21), partly copied).

The difference between embodiment 9 and embodiment 7 is, for a sample in (x,y) location, P(x,y) in the current block, the value of its horizontal predictor $P_h(x,y)$ and the value of its vertical predictor $P_v(x,y)$ are calculated using equations (20) and (21).

Embodiment 10: prediction value of the sample in the current block favors the left sample value and the top sample value (final value using averaging).

The difference between embodiment 10 and embodiment 7 is the final prediction value of P(x,y) is calculated using equation (22).

Embodiment 11: prediction value of the sample in the current block favors the left sample value and the top sample value (final value using weighted).

The difference between embodiment 10 and embodiment 7 is the final prediction value of P(x,y), calculated using equation (24).

Embodiment 12: combination of embodiment 1, embodiment 3, and embodiment 9.

Any embodiment of the first method, second method, and third method can be combined. In this embodiment, a combination of embodiment 1, embodiment 3, and embodiment 9 is proposed.

In this embodiment, the value of the bottom right sample is available (using equation (8)), and also the value of the samples in the bottom row and the right column (using equations (10) and (11)), the value of P(x,y)'s horizontal predictor $P_h(x,y)$ and the value of P(x,y)'s vertical predictor $P_v(x,y)$ are calculated using equations (20) and (21), and then the final predictor calculation using equation (7).

Embodiment 13: prediction value of the sample in the current block favors the left sample value and the top sample value (combine with H.265).

In this embodiment, the value of the right sample is P(W,−1) and the bottom sample is P(−1, H). Then, prediction value of a sample in (x,y) P(x,y) in the current block can be derived using equations (26-28).

Embodiments 1 and 2 are related to the first method noted above. Embodiments 3-5 are related to the second method noted above. Any embodiment of the first method may be combined with an embodiment of the second method, and vice versa. Embodiment 6 provides one example of the combination. Embodiments 7-11 are related to the first method noted above. Any embodiment of the first method and any embodiment of the second method may be combined with an embodiment of the third method. Embodiment 12 provides one example of the combination. Embodiment 13 is related to the third method described above.

Figure 6:
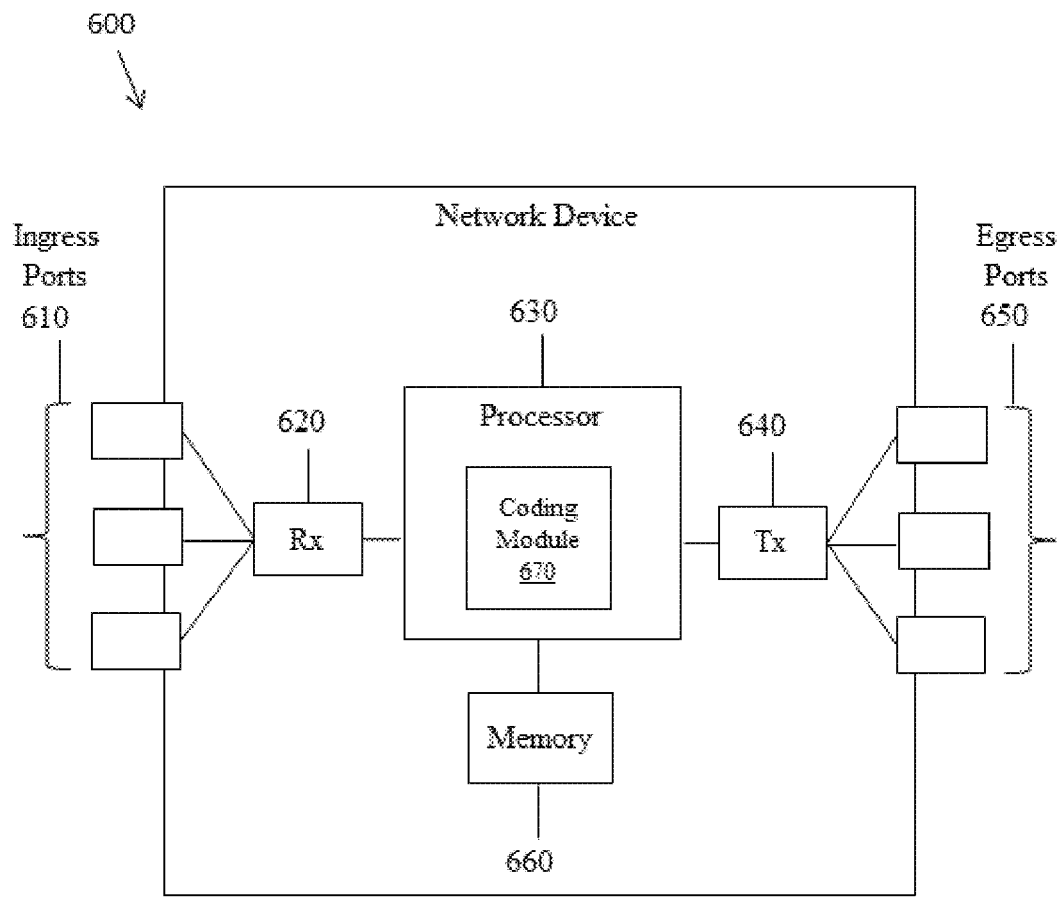
FIG. 6 is a schematic diagram of a network device.

FIG. 6 is a schematic diagram of a network device 600 (e.g., a coding device) according to an embodiment of the disclosure. The network device 600 is suitable for implementing the disclosed embodiments as described herein. In an embodiment, the network device 600 may be a decoder or an encoder. The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises a coding module 670. The coding module 670 implements the disclosed embodiments described above. For instance, the coding module 670 implements, processes, prepares, or provides the various coding operations. The inclusion of the coding module 670 therefore provides a substantial improvement to the functionality of the network device 600 and effects a transformation of the network device 600 to a different state. Alternatively, the coding module 670 is implemented as instructions stored in the memory 660 and executed by the processor 630.

The memory 660 comprises one or more disks, tape drives, and solid-state drives and may be used as an overflow data storage device, to store programs when such programs are selected for execution, and to store instructions and data that are read during program execution. The memory 660 may be volatile and/or non-volatile and may be read-only memory (ROM), random access memory (RAM), ternary content-addressable memory (TCAM), and/or static random-access memory (SRAM).

Figure 7:
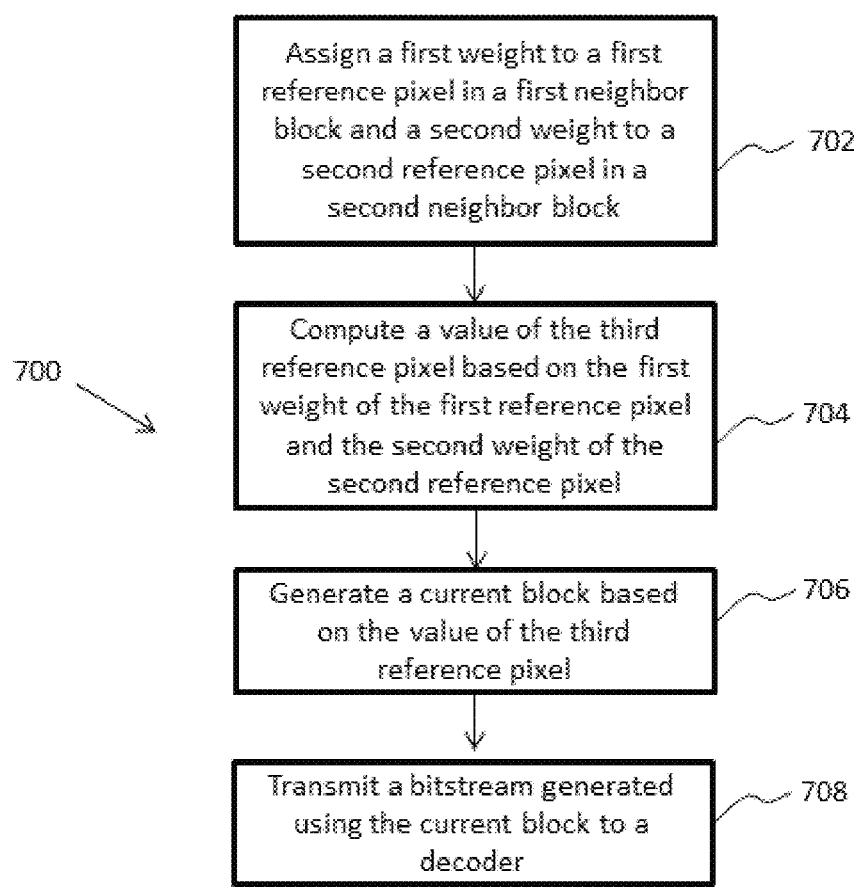
FIG. 7 is a flowchart illustrating an embodiment of a coding method.
Figure 10:
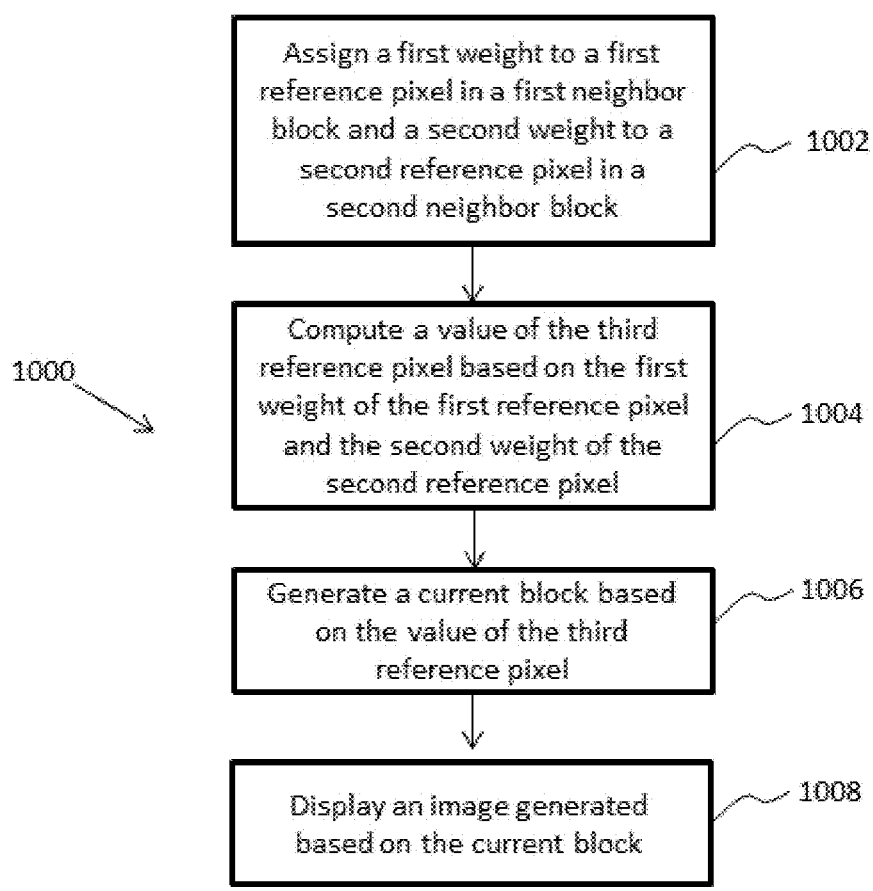
FIG. 10 is a flowchart illustrating an embodiment of a coding method.

FIG. 7 is a flowchart illustrating an embodiment of a coding method 700. In an embodiment, the coding method 700 is implemented in an encoder. The coding method 700 may be implemented when, for example, a bitstream is to be generated. Those skilled in the art will recognize that aspects of the method may also be implemented in a decoder when, for example, a display image is to be generated from a bitstream received from the encoder as represented by FIG. 10 below.

In block 702, a first weight is assigned to a first reference pixel in a first neighbor block and a second weight is assigned to a second reference pixel in a second neighbor block. In an embodiment, the first weight assigned to the first reference pixel is greater than the second weight assigned to the second reference pixel because the first reference pixel is closer to a third reference pixel than the second reference pixel. In an embodiment, the first reference pixel is a TR reference pixel and the second reference pixel is a BL reference pixel.

In block 704, a value of the third reference pixel is computed based on the first weight of the first reference pixel and the second weight of the second reference pixel. In an embodiment, the third reference pixel is a BR reference pixel. In block 706, a current block is generated based on the value of the third reference pixel. In an embodiment, the current block is generated based on a weighted value determined for each reference pixel in a column extending between the third reference pixel and the first reference pixel and in a row extending between the third reference pixel and the second reference pixel. In an embodiment, the current block is generated by calculating a value for each reference pixel in the current block in a manner similar to that described herein. Thereafter, in block 708 a bitstream generated using the current block is transmitted to a decoder.

Figure 8:
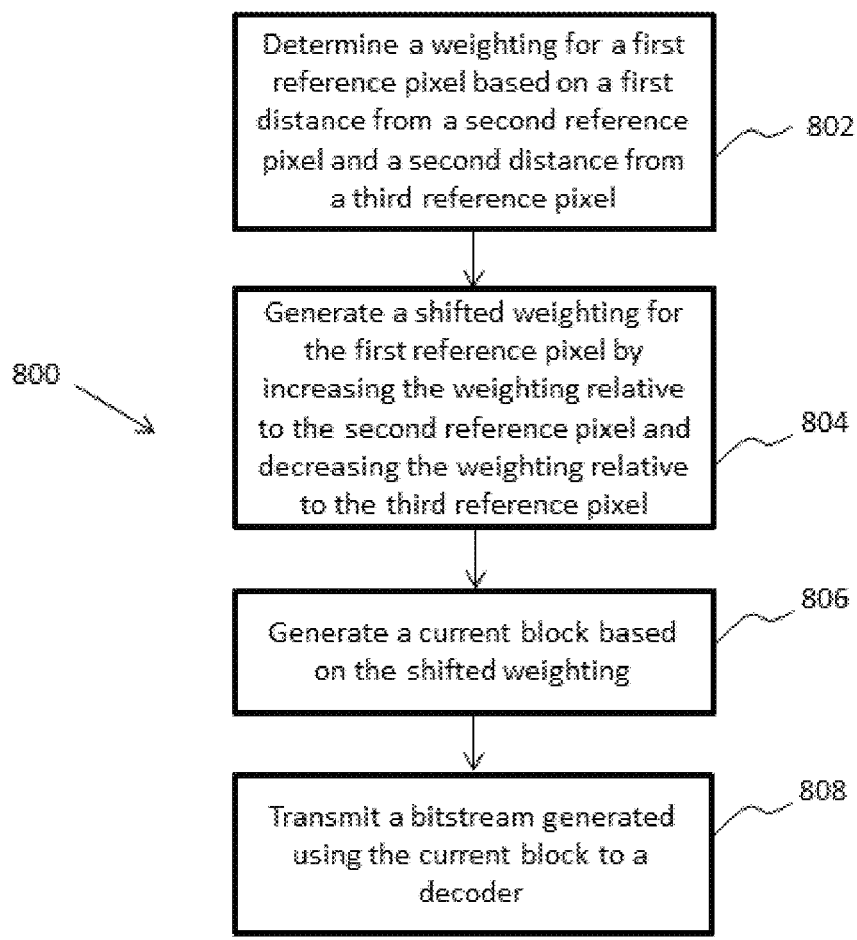
FIG. 8 is a flowchart illustrating an embodiment of a coding method.

FIG. 8 is a flowchart illustrating an embodiment of a coding method 800. In an embodiment the coding method 800 is implemented in an encoder. The coding method 800 may be implemented when, for example, a bitstream is to be generated. Those skilled in the art will recognize that aspects of the method may also be implemented in a decoder when, for example, a display image is to be generated from a bitstream received from the encoder.

In block 802, a weighting is determined for a first reference pixel based on a first distance from a second reference pixel and a second distance from a third reference pixel. In an embodiment, the first reference pixel is disposed in one of a row of reference pixels adjacent to the current block and a column of reference pixels adjacent to the current block. In an embodiment, the second reference pixel is a BL reference pixel and the third reference pixel is a BR reference pixel. In an embodiment, the second reference pixel is a reconstructed pixel from a neighbor block adjacent to the current block and the third reference pixel is an estimated pixel.

In block 804, a shifted weighting for the first reference pixel is generated by increasing the weighting relative to the second reference pixel and decreasing the weighting relative to the third reference pixel. For example, a weighting may be shifted from (7,1) to (8,0) as described above. In block 806, a current block is generated based on the shifted weighting. In an embodiment, the current block is generated by calculating one or more of the reference pixels in a row and/or column using a shifted weighting, by copying a neighbor reference pixel, or some combination thereof.

In an embodiment, a value of the third reference pixel (e.g., the BR reference pixel) is computed based on a first weight assigned to the second reference pixel (e.g., the BL reference pixel) and a second weight assigned to a fourth reference pixel (e.g., the TR reference pixel) and the first weight is greater than the second weight because the second reference pixel is closer to the third reference pixel than the fourth reference pixel. In block 808, a bitstream generated using the current block is transmitted to a decoder.

Figure 9:
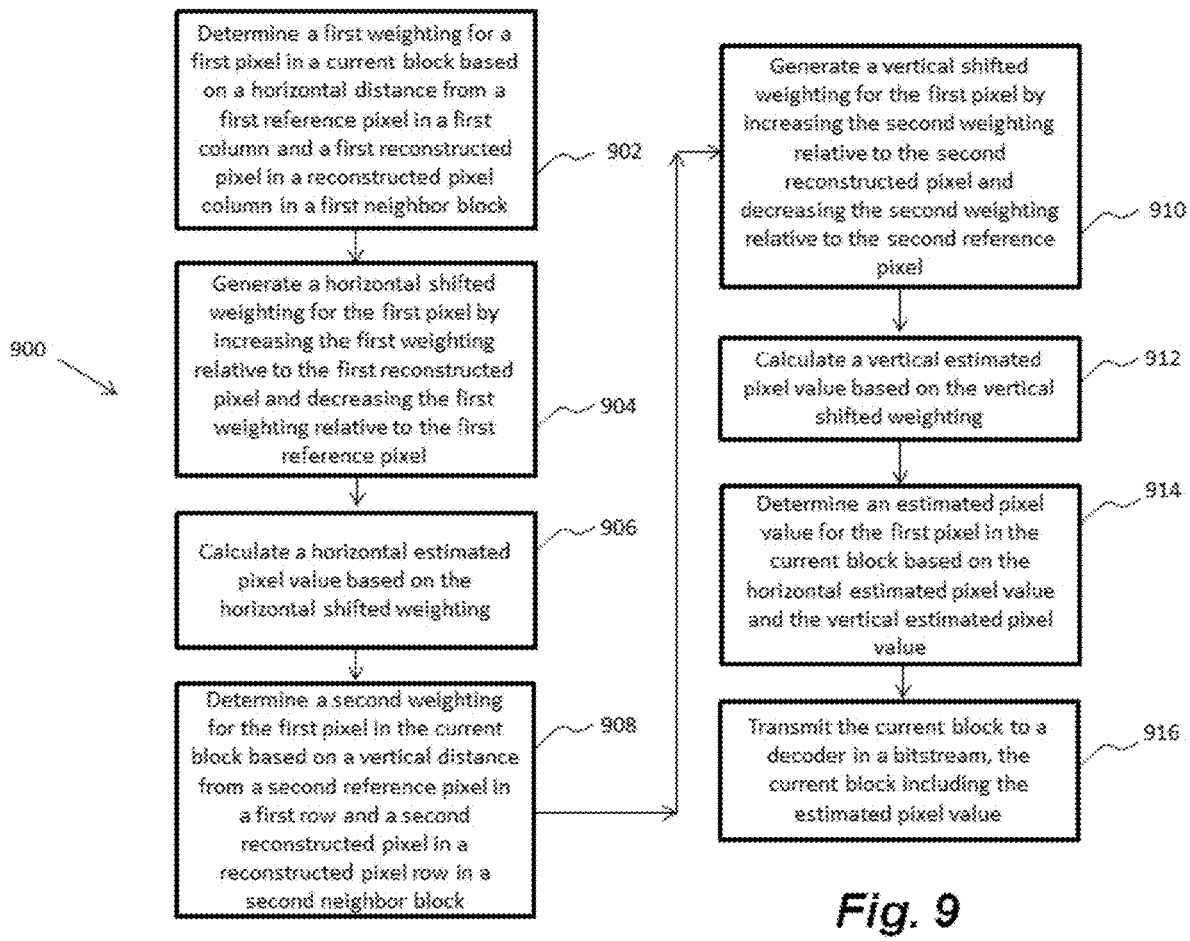
FIG. 9 is a flowchart illustrating an embodiment of a coding method.

FIG. 9 is a flowchart illustrating an embodiment of a coding method 900. In an embodiment, the coding method 900 is implemented in an encoder. The coding method 900 may be implemented when, for example, a bitstream is to be generated. Those skilled in the art will recognize that aspects of the method may also be implemented in a decoder when, for example, a display image is to be generated from a bitstream received from the encoder.

In block 902, a first weighting for a first pixel in a current block is determined based on a horizontal distance from a first reference pixel in a first column and a first reconstructed pixel in a reconstructed pixel column in a first neighbor block. In block 904, a horizontal shifted weighting is generated for the first pixel by increasing the first weighting relative to the first reconstructed pixel and decreasing the first weighting relative to the first reference pixel. In block 906, a horizontal estimated pixel value is calculated based on the horizontal shifted weighting.

In block 908, a second weighting for the first pixel in the current block is determined based on a vertical distance from a second reference pixel in a first row and a second reconstructed pixel in a reconstructed pixel row in a second neighbor block. In block 910, a vertical shifted weighting for the first pixel is generated by increasing the second weighting relative to the second reconstructed pixel and decreasing the second weighting relative to the second reference pixel. In block 912, a vertical estimated pixel value is calculated based on the vertical shifted weighting. In block 914, an estimated pixel value for the first pixel in the current block is determined based on the horizontal estimated pixel value and the vertical estimated pixel value. In block 916, the current block is transmitted to a decoder in a bitstream. The current block includes the estimated pixel value.

FIG. 10 is a flowchart illustrating an embodiment of a coding method 1000. In an embodiment, the coding method 1000 is implemented in a decoder. The coding method 1000 may be implemented when, for example, an image is to be generated based on a current block. In block 1002, a first weight is assigned to a first reference pixel in a first neighbor block and a second weight is assigned to a second reference pixel in a second neighbor block. In an embodiment, the first weight assigned to the first reference pixel is greater than the second weight assigned to the second reference pixel because the first reference pixel is closer to a third reference pixel than the second reference pixel. In an embodiment, the first reference pixel is a TR reference pixel and the second reference pixel is a BL reference pixel.

In block 1004, a value of the third reference pixel is computed based on the first weight of the first reference pixel and the second weight of the second reference pixel. In an embodiment, the third reference pixel is a BR reference pixel. In block 1006, a current block is generated based on the value of the third reference pixel. In an embodiment, the current block is generated based on a weighted value determined for each reference pixel in a column extending between the third reference pixel and the first reference pixel and in a row extending between the third reference pixel and the second reference pixel. In an embodiment, the current block is generated by calculating a value for each reference pixel in the current block in a manner similar to that described herein.

In block 1008, an image generated based on the current block is displayed on a display of an electronic device.

Figure 11:
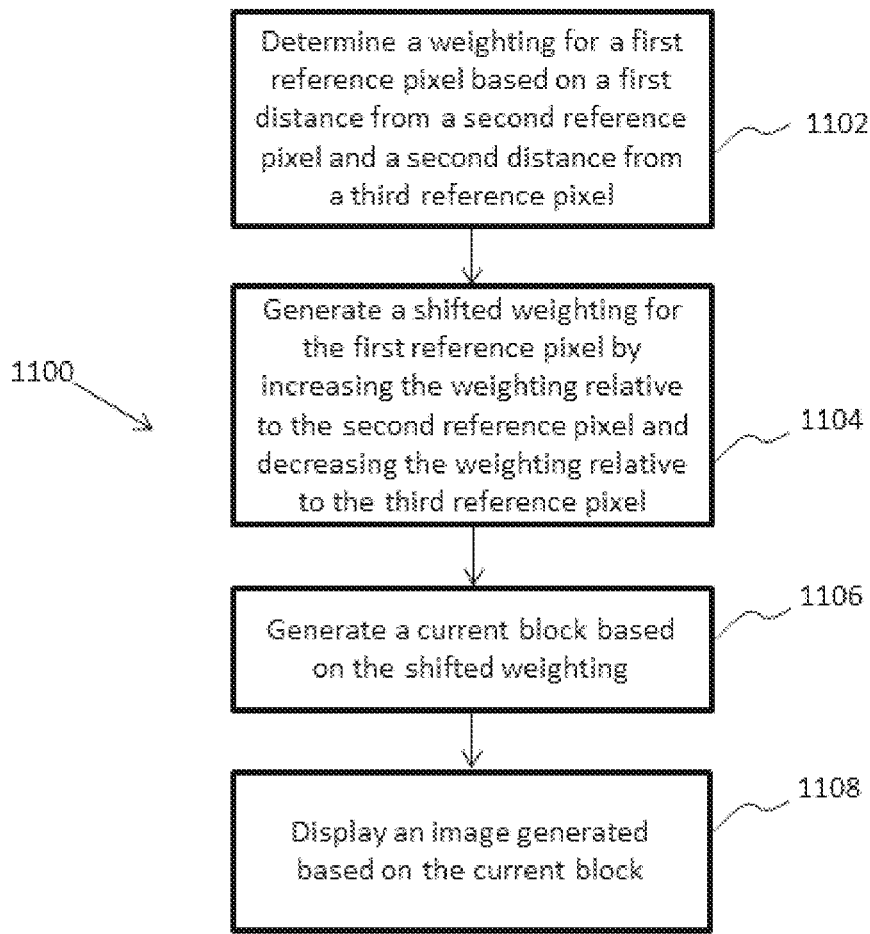
FIG. 11 is a flowchart illustrating an embodiment of a coding method.

FIG. 11 is a flowchart illustrating an embodiment of a coding method 1100. In an embodiment, the coding method 1100 is implemented in a decoder. The coding method 1100 may be implemented when, for example, an image is to be generated based on a current block. In block 1102, a weighting is determined for a first reference pixel based on a first distance from a second reference pixel and a second distance from a third reference pixel. In an embodiment, the first reference pixel is disposed in one of a row of reference pixels adjacent to the current block and a column of reference pixels adjacent to the current block. In an embodiment, the second reference pixel is a BL reference pixel and the third reference pixel is a BR reference pixel. In an embodiment, the second reference pixel is a reconstructed pixel from a neighbor block adjacent to the current block and the third reference pixel is an estimated pixel.

In block 1104, a shifted weighting for the first reference pixel is generated by increasing the weighting relative to the second reference pixel and decreasing the weighting relative to the third reference pixel. For example, a weighting may be shifted from (7,1) to (8,0) as described above. In block 1106, a current block is generated based on the shifted weighting. In an embodiment, the current block is generated by calculating one or more of the reference pixels in a row and/or column using a shifted weighting, by copying a neighbor reference pixel, or some combination thereof.

In an embodiment, a value of the third reference pixel (e.g., the BR reference pixel) is computed based on a first weight assigned to the second reference pixel (e.g., the BL reference pixel) and a second weight assigned to a fourth reference pixel (e.g., the TR reference pixel) and the first weight is greater than the second weight because the second reference pixel is closer to the third reference pixel than the fourth reference pixel. In block 1108, an image generated based on the current block is displayed.

Figure 12:
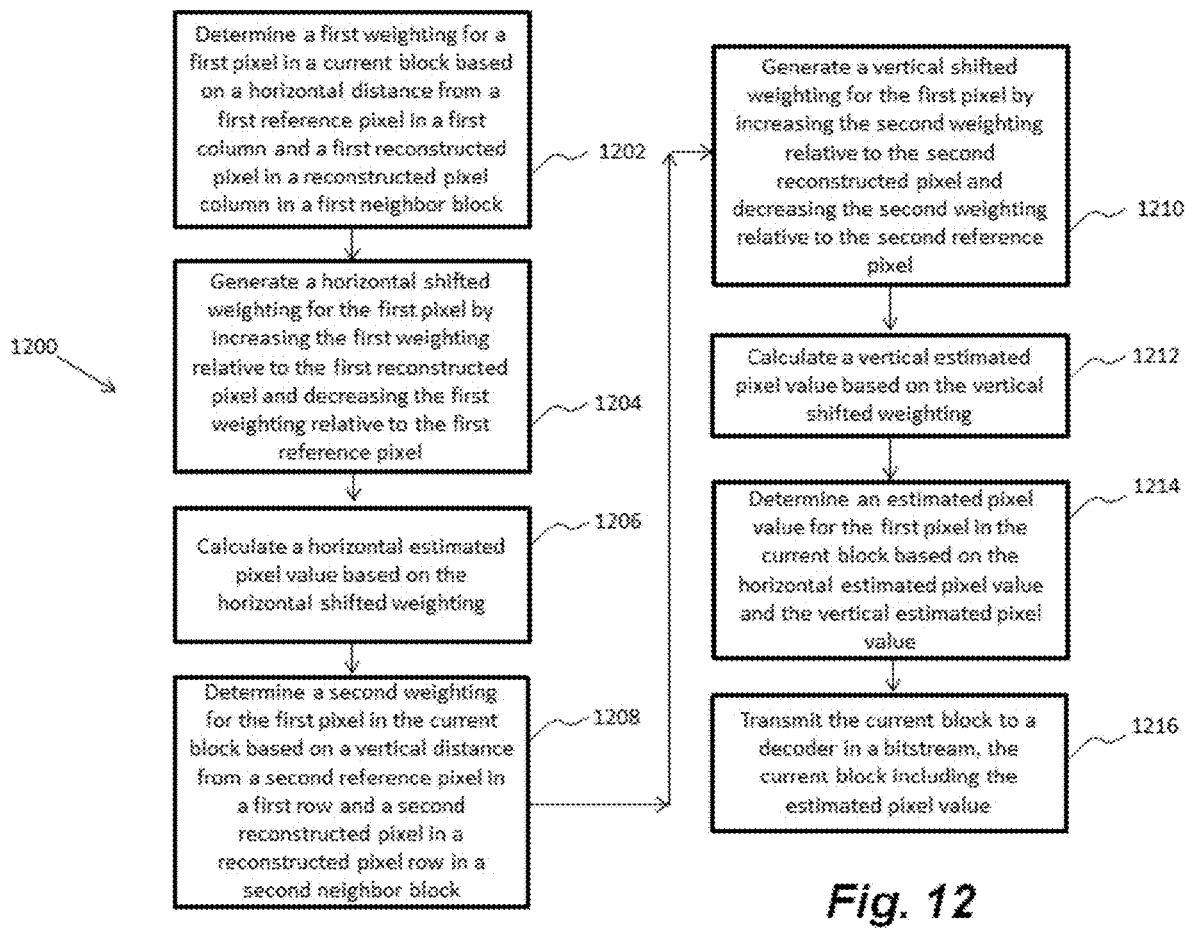
FIG. 12 is a flowchart illustrating an embodiment of a coding method.

FIG. 12 is a flowchart illustrating an embodiment of a coding method 1200. In an embodiment, the coding method 1200 is implemented in a decoder. The coding method 1200 may be implemented when, for example, an image is to be generated based on a current block. In block 1202, a first weighting for a first pixel in a current block is determined based on a horizontal distance from a first reference pixel in a first column and a first reconstructed pixel in a reconstructed pixel column in a first neighbor block. In block 1204, a horizontal shifted weighting is generated for the first pixel by increasing the first weighting relative to the first reconstructed pixel and decreasing the first weighting relative to the first reference pixel. In block 1206, a horizontal estimated pixel value is calculated based on the horizontal shifted weighting.

In block 1208, a second weighting for the first pixel in the current block is determined based on a vertical distance from a second reference pixel in a first row and a second reconstructed pixel in a reconstructed pixel row in a second neighbor block. In block 1210, a vertical shifted weighting for the first pixel is generated by increasing the second weighting relative to the second reconstructed pixel and decreasing the second weighting relative to the second reference pixel. In block 1212, a vertical estimated pixel value is calculated based on the vertical shifted weighting. In block 1214, an estimated pixel value for the first pixel in the current block is determined based on the horizontal estimated pixel value and the vertical estimated pixel value. In block 1216, an image generated based on the current block is displayed. The current block includes the estimated pixel value.

Keeping the above embodiments in mind, an example of the encoding process is provided. Here, the BR reference pixel (e.g., sample) is calculated using the BL reference pixel and the TR reference pixel. Next, the BR reference pixel and the BL reference pixel are used to calculate the bottom row of the current block, and the BR reference pixel and the TR reference pixel are used to calculate the right column of the current block. Once the bottom row and the right column are determined, all of the estimated pixel values for the current block are generated. Next, a residual block is determined based on the difference between the current block and the original block. A transform (e.g., discrete cosine transform (DCT), etc.) is performed on the residual block to convert from pixels to frequency and to generate coefficients. The coefficients are quantized and then entropy encoded into a bitstream. Thereafter, the bitstream is transmitted to a decoder.

In addition to the above, an example of a decoding process is provided. Here, the bitstream is received from the encoder and entropy decoded to obtain the coefficients. An inverse transform is applied to the coefficients to convert back to the frequency domain to obtain the pixel residuals. The residuals are added to the current block (a.k.a., the prediction block) in order to obtain the original block. The original block is then used to generate an image that may be displayed on the screen of an electronic device (e.g., a smart phone, a tablet device, a computer, etc.). The original block may also be stored in memory.

A method of coding including means for assigning a first weight to a first reference pixel in a first neighbor block and a second weight to a second reference pixel in a second neighbor block, wherein the first weight assigned to the first reference pixel is greater than the second weight assigned to the second reference pixel because the first reference pixel is closer to a third reference pixel than the second reference pixel, means for computing a value of the third reference pixel based on the first weight of the first reference pixel and the second weight of the second reference pixel, means for generating a current block based on the value of the third reference pixel, and means for displaying an image generated based on the current block.

A coding apparatus including memory means containing instructions, a processing means coupled to the memory means, the processor means configured to execute the instructions stored in the memory means to cause the processor means to assign a first weight to a first reference pixel in a first neighbor block and a second weight to a second reference pixel in a second neighbor block, wherein the first weight assigned to the first reference pixel is greater than the second weight assigned to the second reference pixel because the first reference pixel is closer to a third reference pixel than the second reference pixel, compute a value of the third reference pixel based on the first weight of the first reference pixel and the second weight of the second reference pixel, and generate a current block based on the value of the third reference pixel, and means for displaying an image generated based on the current block.

A method of coding including means for determining a weighting for a first reference pixel based on a first distance from a second reference pixel and a second distance from a third reference pixel, means for generating a shifted weighting for the first reference pixel by increasing the weighting relative to the second reference pixel and decreasing the weighting relative to the third reference pixel, means for generating a current block based on the shifted weighting, and means for displaying an image generated based on the current block.

A coding apparatus including memory means containing instructions, processor means coupled to the memory means, the processor means configured to execute the instructions stored in the memory means to cause the processor means to determine a weighting for a first reference pixel based on a first distance from a second reference pixel and a second distance from a third reference pixel, generate a shifted weighting for the first reference pixel by increasing the weighting relative to the second reference pixel and decreasing the weighting relative to the third reference pixel, and generate a current block based on the shifted weighting, and displaying means coupled to the processing means, the displaying means configured to display an image generated based on the current block.

A method of coding including means for determining a first weighting for a first pixel in a current block based on a horizontal distance from a first reference pixel in a first column and a first reconstructed pixel in a reconstructed pixel column in a first neighbor block, means for generating a horizontal shifted weighting for the first pixel by increasing the first weighting relative to the first reconstructed pixel and decreasing the first weighting relative to the first reference pixel, means for calculating a horizontal estimated pixel value based on the horizontal shifted weighting, means for determining a second weighting for the first pixel in the current block based on a vertical distance from a second reference pixel in a first row and a second reconstructed pixel in a reconstructed pixel row in a second neighbor block, means generating a vertical shifted weighting for the first pixel by increasing the second weighting relative to the second reconstructed pixel and decreasing the second weighting relative to the second reference pixel, means for calculating a vertical estimated pixel value based on the vertical shifted weighting, means for determining an estimated pixel value for the first pixel in the current block based on the horizontal estimated pixel value and the vertical estimated pixel value, and means for displaying, on a display of an electronic device, an image generated based on the current block.

A coding apparatus including memory means containing instructions, processor means coupled to the memory means, the processor means configured to execute the instructions stored in the memory to cause the processor means to determine a first weighting for a first pixel in a current block based on a horizontal distance from a first reference pixel in a first column and a first reconstructed pixel in a reconstructed pixel column in a first neighbor block, generate a horizontal shifted weighting for the first pixel by increasing the first weighting relative to the first reconstructed pixel and decreasing the first weighting relative to the first reference pixel, calculate a horizontal estimated pixel value based on the horizontal shifted weighting, determine a second weighting for the first pixel in the current block based on a vertical distance from a second reference pixel in a first row and a second reconstructed pixel in a reconstructed pixel row in a second neighbor block, generate a vertical shifted weighting for the first pixel by increasing the second weighting relative to the second reconstructed pixel and decreasing the second weighting relative to the second reference pixel, calculate a vertical estimated pixel value based on the vertical shifted weighting, and determine an estimated pixel value for the first pixel in the current block based on the horizontal estimated pixel value and the vertical estimated pixel value, and a display means coupled to the processor means, the display means configured to display an image generated based on the current block.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a coding device, comprising:
  assigning a first weight to a first reference pixel in a first neighbor block and a second weight to a second reference pixel in a second neighbor block, wherein the first weight assigned to the first reference pixel is greater than the second weight assigned to the second reference pixel when the first reference pixel is closer to a third reference pixel than the second reference pixel;

computing a value of the third reference pixel based on the first weight of the first reference pixel and the second weight of the second reference pixel;

generating a current block based on the value of the third reference pixel using intra prediction; and displaying, on a display of an electronic device, an image generated based on the current block.

2. The method of claim 1, wherein the first reference pixel is a top right (TR) reference pixel, the second reference pixel is a bottom left (BL) reference pixel, and the third reference pixel is a bottom right (BR) reference pixel.

3. The method of claim 1, further comprising computing the value of the third reference pixel based on a product of the first weight and the first reference pixel and a product of the second weight and the second reference pixel.

4. The method of claim 1, wherein the current block is a rectangle.

5. The method of claim 1, wherein the value of the third reference pixel and the first weight of the first reference pixel are used to calculate a weighted value for each intermediate reference pixel in a column extending between the third reference pixel and the first reference pixel.

6. The method of claim 1, wherein the value of the third reference pixel and the second weight of the second reference pixel are used to calculate a weighted value for each reference pixel in a row extending between the third reference pixel and the second reference pixel.

7. The method of claim 1, wherein the current block is generated based on a weighted value determined for each reference pixel in a column extending between the third reference pixel and the first reference pixel and in a row extending between the third reference pixel and the second reference pixel.

8. The method of claim 1, wherein the first weight is assigned based on a first number of reference pixels disposed between the third reference pixel and the second reference pixel, and the second weight is assigned based on a second number of reference pixels disposed between the third reference pixel and the first reference pixel.

9. The method of claim 1, wherein the first weight is assigned based on a first distance between the third reference pixel and the second reference pixel, and the second weight is assigned based on a second distance between the third reference pixel and the first reference pixel.

10. A coding apparatus, comprising:
a memory containing instructions;
a processor coupled to the memory, the processor configured to execute the instructions stored in the memory to cause the processor to:
assign a first weight to a first reference pixel in a first neighbor block and a second weight to a second reference pixel in a second neighbor block, wherein the first weight assigned to the first reference pixel is greater than the second weight assigned to the second reference pixel when the first reference pixel is closer to a third reference pixel than the second reference pixel;
compute a value of the third reference pixel based on the first weight of the first reference pixel and the second weight of the second reference pixel; and
generate a current block based on the value of the third reference pixel using intra prediction; and
a display coupled to the processor, the display configured to display an image generated based on the current block.

11. The coding apparatus of claim 10, wherein the first reference pixel is a top right (TR) reference pixel and the second reference pixel is a bottom left (BL) reference pixel.

12. The coding apparatus of claim 10, wherein the third reference pixel is a bottom right (BR) reference pixel.

13. The coding apparatus of claim 10, wherein the current block is a rectangle.

14. The coding apparatus of claim 10, wherein the value of the third reference pixel and the first weight of the first reference pixel are used to calculate a weighted value for each intermediate reference pixel in a column extending between the third reference pixel and the first reference pixel.

15. The coding apparatus of claim 10, wherein the value of the third reference pixel and the second weight of the second reference pixel are used to calculate a weighted value for each intermediate reference pixel in a row extending between the third reference pixel and the second reference pixel.

16. The coding apparatus of claim 10, wherein the current block is generated based on a weighted value determined for each intermediate reference pixel in a column extending between the third reference pixel and the first reference pixel and in a row extending between the third reference pixel and the second reference pixel.

17. The coding apparatus of claim 10, wherein the first weight is assigned based on a first number of intermediate reference pixels disposed between the third reference pixel and the first reference pixel, and the second weight is assigned based on a second number of intermediate reference pixels disposed between the third reference pixel and the second reference pixel.

18. The coding apparatus of claim 10, wherein the first weight is assigned based on a first distance between the third reference pixel and the first reference pixel, and the second weight is assigned based on a second distance between the third reference pixel and the second reference pixel.

* * * * *